United States Patent Office 3,462,501
Patented Aug. 19, 1969

3,462,501
PROCESS FOR PREPARING ALLYL CHLORIDE
AND ITS MONOMETHYL-SUBSTITUTION
PRODUCTS
Lothar Hörnig and Günter Mau, Frankfurt am Main, Germany, assignors to Farbwerke Hoechst Aktiengesellschaft vormals Meister Lucius & Bruning, Frankfurt am Main, Germany, a corporation of Germany
No Drawing. Filed June 6, 1966, Ser. No. 555,274
Claims priority, application Germany, June 19, 1965,
F 46,384
Int. Cl. C07c 17/10; B01j 11/78
U.S. Cl. 260—654                11 Claims

ABSTRACT OF THE DISCLOSURE

The oxidation of olefins and monochloroparaffins to allyl chloride and methallyl chloride in the presence of a tellurium compound as a catalyst is improved by addition to the catalyst of an alkali metal chloride, phosphate, sulfate, nitrate, oxide or hydroxide and/or ammonium chloride, an alkyl ammonium chloride, and aryl ammonium chloride, a piperidinium chloride, a pyridinium chloride or an alkanolamine.

---

The present invention relates to a process for preparing allyl chloride and its monomethyl-substitution products.

It has been proposed to prepare allyl chloride and methyl-substituted allyl chloride by passing oxygen and (a) mixtures of olefins with 3 to 4 carbon atoms and hydrogen chloride or (b) monochloroparaffins with 3 to 4 carbon atoms or (c) mixtures of (a) and (b) over catalysts containing elementary tellurium and/or tellurium compounds.

The present invention provides a process for preparing allyl chloride and its monomethyl-substitution products from oxygen and (a) mixtures of olefins with 3 to 4 carbon atoms and hydrogen chloride or (b) monochloroparaffins with 3 to 4 carbon atoms or (c) mixtures of olefins with 3 to 4 carbon atoms, hydrogen chloride and monochloroparaffins with 3 to 4 carbon atoms in the presence of catalysts containing tellurium and/or tellurium compounds, which comprises passing the starting compounds over catalysts containing tellurium and/or tellurium compounds and alkali metal compounds and/or at least one basic nitrogen compound or the salt thereof.

In the following description the term "additives" refers to alkali metal compounds, basic nitrogen compounds, the salts thereof and/or mixtures of the aforesaid compounds.

It is suitable to support the catalyst containing free and/or bound tellurium and one of the specified additives on an inert carrier material, for example aluminum oxide, bentonite and other aluminum silicates, silica gel, sandstone, silicium carbide, feldspar, pumice, asbestos or carbon.

When alkali metal compounds are used as additives compounds of potassium, rubidium and/or cesium are preferred. These metals distinguish from lithium and sodium and all other metals in that their atomic radius is greater than 2.2 Angstrom units (cf. H. Remy, Lehrbuch der anorganischen Chemie, Akad. Verlagsges. Geest & Portig, Leipzig 1950, page 22).

Suitable compounds of the alkali metals are especially their salts with oxygen-free and oxygen-containing acids of nonmetals of the general formula $H_nX_mO_p$ in which $n$ stands for 1, 2, 3 or 4; $m$ is 1, 2, 3 or 4; $p$ is zero or a number in the range of from 1 to 8 and X stands for chlorine, fluorine, bromine, iodine, selenium, sulfur, nitrogen, phosphorus or carbon, for example the fluorides, bromides, iodides, hypochlorites, chlorites, chlorates, perchlorates, hypobromites, bromates, hypoiodites, iodates, periodates, sulfides, hyposulfides, sulfites, sulfates, peroxysulfates, peroxydisulfates, disulfates, hypodisulfates, disulfites, hypodisulfites, thiosulfates, polythionates, selenides, selenites, selenates, nitrites, nitrates, hypophosphites, phosphites, phosphates, peroxyphosphates, diphosphites, hypodiphosphites, diphosphates, peroxyphosphates, carbonates, and the like. When salts of polybasic acids are used they may be neutral or acid. The chlorides, o-phosphates, sulfates and nitrates are preferred. The hydroxides and oxides of the alkali metals may be used, too.

Salts of basic nitrogen compounds to be used as additives are especially ammonium salts and ammonium salts carrying hydrocarbon substituents. There can be used, for example:

(a) Mono-, di-, tri-, and tetraalkyl-ammonium salts having identical or different alkyl groups, for example methyl-, dimethyl-, trimethyl-, tetramethyl-, tri-isopropyl-, methylethyl-, stearyl-, or methylbutyl-dodecyl-ammonium salts;

(b) Aryl-ammonium salts such as anilinium salts as well as mono-, di-, and trialkyl-monoaryl-ammonium salts such as N-methyl-, N,N-dimethyl-, and N,N,N-trimethylanilinium salts;

(c) Ammonium salts of aza-cycloaliphatic compounds such as pyrrolidinium salts and piperidinium salts and the N-monoalkyl- and N,N-dialkyl-derivatives thereof and, for example, bis-1,5-pentamethylene-ammonium salts $[(CH_2)_5N(CH_2)_5]^+X^-$;

(d) The salts of aromatic nitrogen bases, such as pyridinium salts, quinolinium salts, isoquinolinium salts and the alkyl derivatives thereof, for example N-methylpyridinium or picolinium, lutidinium and collidinium salts.

Besides the mono-ammonium salts, the salts of polyvalent amines as well as the salts of alkanolamines can be used, for example:

(e) Alkylene diammonium salts such as ethylene diammonium salts, hexamethylene diammonium salts or phenylene diammonium salts;

(f) Mono-, di-, and trialkanolammonium salts such as di-ethanolammonium salts and the like.

Preferred ammonium salts are the hydrochlorides and among these especially in group (a) the ammonium chlorides carrying 1 to 4 methyl groups and the ammonium chlorides carrying 4 alkyl groups, in group (b) anilinium chloride and anilinium chlorides carrying at the nitrogen atom and/or the phenyl nucleus one or several methyl groups, and in group (d) pyridinium chloride and pyridinium chlorides carrying at the nitrogen atom and/or the aromatic nucleus one methyl group or several methyl groups.

In principle, all salts obtained from the amines forming the basis of the specified salts and the defined acids of the formula $H_nX_mO_p$ can be successfully used in the process of the invention.

The catalyst is advantageously prepared from tellurium and/or industrially readily accessible tellurium compounds, for example tellurium–IV chloride, tellurium–IV oxide, and telluric acid, and the additives specified above. Further suitable tellurium compounds are, for example, tellurium–II oxide, tellurium–II chloride, tellurium–IV oxychloride, hydrogen telluride, tellurous acid, metatelluric acid, tellurites, tellurates, tellurides as well as organic tellurium compounds, for example alkyl- or dialkyltellurides, alkyl-tellurium trichlorides, dialkyl-tellurium dichlorides and the like.

It is likewise possible to use as starting products compounds containing tellurium as well as one of the alkali metals or the ammonium group, for example alkali metal or ammonium tellurides, tellurites, tellurates or hexachlorotellurates. When basic nitrogen compounds or the salts thereof are used as additives for making the catalysts, instead of the aforesaid ammonium salts the corresponding free amines or the hydroxides thereof are often used.

Alternatively, the mixed catalysts can be prepared from organic tellurium compounds and alkali metal or ammonium salts. There may be used alkali metal or ammonium salts of organic acids such as formiates, acetates, oxalates and the like and the aforesaid alkyl- or dialkyltellurides, alkyl-tellurium-trichlorides or dialkyl-tellurium dichlorides.

More particularly, when alkali metal compounds are used as additives it is advantageous, for example, to mix a solution of tellurium–IV chloride and potassium chloride in aqueous hydrochloric acid or an aqueous solution of cesium chloride and telluric acid or an (alkaline) solution of tellurium–IV oxide in aqueous rubidium hydroxide solution with the carrier materials and to dry or to evaporate to dryness the mixture obtained. It is also possible to apply the catalyst components to the carrier one after the other. For example, the carrier can be first impregnated with a solution of tellurium–IV chloride in hydrochloric acid, the mixture can be treated with sulfur dioxide whereby elementary tellurium is formed, and then the alkali metal salt, for example rubidium chloride can be applied. Still further, the alkali metal salt, for example cesium sulfate may first be applied to the carrier and then a tellurium compound, for example telluric acid.

In many cases the composition of the freshly used mixed catalyst changes during the course of the reaction according to the invention. Especially, after a certain starting period the tellurium contained in the catalyst is partially present in elementary form, while the alkali metal compounds are often transformed, wholly or partially, into the chlorides.

It is suitable to adjust the content of tellurium and/or tellurium compounds in the catalyst/carrier system in a manner such that the system contains 0.1 to 30 and preferably 0.5 to 20% by weight of tellurium. The atomic proportion of the alkali metals contained in the catalyst to the free or bound tellurium is advantageously adjusted to a value in the range of from 0.1:1 to 10:1. Of course, the catalyst can also be used without carrier material, for example in the form of mixtures of tellurium and potassium chloride or telluric acid and rubidium sulfate or in the form of cesium-hexachlorotellurate. Alternatively, catalyst solutions may be used, for example solutions of tellurium–IV chloride and potassium chloride in hydrochloric acid, or catalyst suspensions, for example a suspension of cesium-hexachlorotellurate in hydrochloric acid.

When additives are used that contain basic nitrogen it is suitable to mix aqueous solutions, either acid or alkaline solutions, of tellurium and ammonium compounds with the carrier material and to evaporate the mixture to dryness. Solutions of tellurium–IV chloride and dimethylammonium chloride in aqueous hydrochloric acid or aqueous solutions of telluric acid and anilinium sulfate or ammoniacal solutions of tellurium–IV oxide can be used. It is also possible to apply the catalyst constituents to the carrier one after the other, i.e. the carrier can be first impregnated with a solution of tellurium–IV chloride in hydrochloric acid, the mixture can be treated with sulfur dioxide to reduce the tellurium–IV compound and then an aqueous solution of an ammonium salt can be applied, for example a solution of pyridinium chloride. Alternatively, an appropriate ammonium salt can be applied first, for example tetramethylammonium chloride, and then a tellurium compound, for example aqueous orthotelluric acid.

In many cases the composition of the freshly used mixed catalyst changes during the course of the reaction according to the invention. Especially, after a certain starting period part of the tellurium contained in the catalyst is present in elementary form, while the ammonium salts used are often transformed, wholly or partially, into the chlorides and/or free amines. It is advantageous to adjust the content of the catalyst/carrier system of tellurium or tellurium compounds, respectively, in such a manner that the system contains 0.5 to 20% by weight of tellurium. The process can also be performed with lower and higher tellurium concentrations. The atomic proportion of the ammonium nitrogen contained in the catalyst to the free or bound tellurium is suitably adjusted to a value in the range of from 0.1:1 to 10:1.

It is also possible, of course, to use the catalysts without carrier material, for example in the form of a mixture of tellurium with an ammonium chloride which may carry hydrocarbon radicals as substituents, or in the form of diammonium-hexachlorotellurates. Alternatively, catalyst solutions may be used, for example solutions of tellurium–IV chloride and piperidinium chloride in hydrochloric acid.

When olefins, hydrogen chloride and oxygen are reacted allyl chloride is obtained from propylene, 3-chlorobutene-1 from butene-1, crotyl chloride from butene-2 and methallyl chloride from isobutylene. The reaction of propylene to give allyl chloride and of isobutylene to methallyl choride is especially smooth.

When a monochloroparaffin is reacted with oxygen, allyl chloride is obtained from isopropyl chloride and/or n-propyl chloride. Using tert.butyl chloride and/or isobutyl chloride the reaction yields methallyl chloride. With the use of n-butyl chloride and/or sec.butyl chloride a small amount of crotyl chloride and 3-chlorobutene-1 are obtained. The reaction of isopropyl chloride to yield allyl chloride and of tert.butyl chloride to methallyl chloride (3-chloro-2-methylpropylene-1) is especially smooth.

In general, the reaction is carried out in such a manner that the starting components hydrogen chloride, oxygen and olefin, or oxygen and monochloroparaffin, advantageously in admixture with one another, are passed over the solid or dissolved catalyst. When the olefin or monochloroparaffin is not gaseous but liquid under the reaction conditions or is dissolved in a solvent, the mixture of oxygen and hydrogen chloride, on the one hand, and the liquid olifin, on the other, or the oxygen, on the one hand, and the liquid monochloroparaffin, on the other, may be passed in counter-current flow or in parallel flow over a fixed bed catalyst, this being a mixed phase reaction. Alternatively, the reaction can be carried out in a suspension of the catalyst in a liquid. In this case, too, the catalyst may contain a carrier material. The liquid used to suspend the catalyst may be the olefin or the monochloroparaffin itself or a solution thereof in a solvent that is inert in the reaction.

The starting components can also be used in admixture with gases that are inert under the reaction conditions, for example low molecular weight saturated hydrocarbons, such as ethane, propane, butanes, and nitrogen, noble gases, carbon dioxide, or hydrogen. The oxygen required for the reaction may be used in the form of air and the hydrochloric acid may be used in the form of vapors of aqueous hydrochloric acid. If aqueous hydrochloric acid is used as starting component, it may also be contacted with the catalyst as a liquid.

Liquid starting components may be used in admixture with inert solvents, for example chlorinated hydrocarbons, such as chloroform, saturated hydrocarbons such as hexane, and benzene.

Preferably, the reaction is carried out in such a manner that a gas mixture containing the reaction components is passed through a tube filled with the catalyst, the gas mixture is condensed at the end of the reaction tube, any unreacted or formed monochloroparaffin is separated from the condensate and recycled wholly or partially into the reaction tube together with the uncondensed portion of the reaction gas. In the preferred case of the preparation of allyl chloride from propylene or isopropyl chloride or of methallyl chloride from isobutylene or tert. butyl chloride it is advantageous to cool the gas mixture at the end of the reaction zone to a temperature above the boiling point of the olefin or monochloroparaffin but below the boiling point of allyl chloride or methallyl chloride, respectively. By carrying out this partial condensation, the expense of condensation and revaporization of any unreacted or newly formed monochloroparaffin to be recycled into the reaction zone is saved.

It is advantageous but not essential to select such a temperature and pressure that the monochloroparaffin is present in the gaseous state.

The reaction products are worked up in usual manner. After having left the reaction zone the reaction mixture is cooled, whereby the allyl chloride or its methyl substitution product and any unreacted or newly formed monochloroparaffin are condensed. The condensate is preferably separated into its components by distillation. In some cases, as has already been indicated above, a partial condensation may be performed, whereby the allyl chloride is separated from the monochloroparaffin, which is then recycled into the reaction zone. The limit of explosion of the gas mixtures containing oxygen prior to entering, in and after having left the reaction zone, determines whether the starting components olefin, hydrogen chloride and oxygen or monochloroparaffin and oxygen can be used in stoichiometric amounts. In general, oxygen is used in an amount below the stoichiometric amount. The molar proportion of monochloroparaffin to oxygen or olefin to oxygen or the sum of monochloroparaffin and olefin to oxygen is advantageously in the range of 20:1 and 1:1, preferably 10:1 and 1:1. The molar proportion of olefin to hydrogen chloride is suitably in the range of 10:1 and 1:1 and preferably 5:1 and 1:1. However, a ratio outside these ranges is also possible. In general, the reaction is not quantitative. After separation of the reaction products the starting components are, therefore, recycled into the reactor.

The temperatures and pressures at which the process is carried out are not critical. In order to obtain high conversions it is advantageous to work at high temperatures and high pressure. Too high a temperature, however, favors the formation of undesired oxidation products while too high a pressure favors the formation of addition products of hydrogen chloride on the olefin, for example 2-chloropropane and 1-chloropropane when propylene is used. It is therefore advantageous to operate at a temperature in the range of 20 to 350° C. and preferably 100 to 350° C. and under a pressure in the range of 0.2 to 20 atmospheres, preferably 1 to 10 atmospheres. However, the reaction takes even place outside of the aforesaid ranges.

The process according to the invention, which differs from the proposed process by the additional content of the catalyst of alkali metal salts or ammonium salts, offers the advantage of considerably high space/time yields with otherwise identical catalyst composition.

The following examples serve to illustrate the invention but they are not intended to limit it thereto; the gaseous components were measured under standard conditions, i.e., 0° C. and 760 mm. of mercury.

EXAMPLE 1

300 cc. of aluminum silicate in the form of balls having a diameter of 3 mm. were impregnated with a solution of 16 grams of tellurium–IV oxide and 15 grams of potassium chloride in aqueous hydrochloric acid and the mixture was evaporated to dryness. The catalyst obtained was filled into a glass tube having an internal diameter of 40 mm. and heated at 225° C. 100 liters of a gas mixture consisting of propylene, hydrogen chloride and oxygen into a ratio by volume of 50:25:25 were passed per hour through the reactor. After condensation of the stoichiometric amount of water formed, the gas leaving the reactor contained about 10% by volume of allyl chloride.

In a comparative experiment carried out with the same catalyst which was free from potassium chloride only 6% by volume of allyl chloride were obtained.

EXAMPLE 2

200 cc. of kieselgel in the form of cylinders having a diameter of 3 mm. and a length of 6–8 mm. were impregnated with an aqueous solution of 10 grams of orthotelluric acid and 17 grams of cesium chloride. The dried mixture was filled into a reactor having an internal diameter of 25 mm. At 200° C. and atmospheric pressure 30 liters of propylene, 15 liters of hydrogen chloride and 10 liters of oxygen were passed through the reactor per hour. At the outlet of the reactor the gas mixture was cooled to −35° C. whereby a condensate was obtained containing per hour 9 grams of allyl chloride, 8 grams of isopropyl chloride and 0.8 gram of 1,2-dichloropropane.

An analogous catalyst which did not contain any cesium chloride was treated under the same conditions. The yield obtained amounted to 4 grams of allyl chloride, 8 grams of isopropyl chloride and 0.2 gram of 1,2-dichloropropane per hour.

EXAMPLE 3

1000 cc. of bentonite in the form of balls having a diameter of 5 mm. were impregnated with a solution of 0.5 mole of tellurium–IV chloride in concentrated hydrochloric acid and the mixture was evaporated to dryness. The mixture was then treated with sulfur dioxide at 100° C. whereby the tellurium compound was reduced to the metal state. At 100° C. nitrogen was passed through the catalyst and then the catalyst was rinsed with water at 20° C.

500 cc. of the catalyst were impregnated with an aqueous solution of 0.6 mole of rubidium chloride and evaporated to dryness. The portion containing tellurium alone and the portion containing tellurium and rubidium were divided each time into 4 aliquots and in 4 test series one part of each type was treated in separate reaction tubes having a diameter of 20 mm., at 180° C. and atmospheric pressure, with gas mixtures containing per hour 5 liters of oxygen and (a) 15 liters of propylene and 15 liters of hydrogen chloride
(b) 15 liters of isobutylene and 15 liters of hydrogen chloride
(c) 53 grams of previously evaporated isopropyl chloride
(d) 62 grams of previously evaporated tert. butyl chloride The gas mixtures leaving the reaction tubes were condensed. With the use of the 4 aliquots of the tellurium-rubidium catalyst the condensates contained per hour

|   |   | Grams |
|---|---|---|
| (a) | Allyl chloride | 6 |
| (b) | Methallyl chloride | 5 |
| (c) | Allyl chloride | 6 |
| (d) | Methallyl chloride | 4 | and with the use of the tellurium catalyst that did not contain rubidium the condensates contained per hour

|   |   | Grams |
|---|---|---|
| (a) | Allyl chloride | 3 |
| (b) | Methallyl chloride | 3 |
| (c) | Allyl chloride | 4 |
| (d) | Methallyl chloride | 2 |

EXAMPLE 4

300 grams of silica gel having a medium grain size of 5 mm. were evaporated to dryness with a solution of 12 grams of tellurium-IV oxide and 8 grams of ammonium chloride in 2 N hydrochloric acid. The catalyst obtained was heated at 180° C. in a heatable reaction tube and at atmospheric pressure a gas mixture consisting of 60% by volume of propylene, 20% by volume of oxygen and 20% by volume of hydrogen chloride was passed through. With a gas supply of 55 liters per hour, the gas leaving the reaction tube contained 6% by volume of allyl chloride. Under the same reaction conditions with a catalyst containing the same amount of tellurium but no ammonium chloride, the off gas contained about 4% by volume of allyl chloride only.

EXAMPLE 5

A gas mixture consisting of 85 grams of evaporated isopropyl chloride and 12 liters of oxygen was passed per hour over the catalyst prepared as described in Example 4. At 200° C. and atmospheric pressure the condensate obtained at the outlet of the reactor contained 9 grams of allyl chloride.

EXAMPLE 6

1200 milliliters of bentonite in the form of balls having a diameter of 5 mm. were mixed with a solution of 0.4 mole of tellurium–IV chloride in concentrated hydrochloric acid, the mixture was evaporated to dryness and treated at 100° C. with sulfur dioxide. The tellurium compound was thereby reduced to metallic tellurium. The catalyst was thoroughly washed with water and dried again. It was divided into 8 aliquots. Over portions 2 to 8 (cf. the following table) a solution of 0.1 mole of an ammonium chloride in hydrochloric acid was poured and the resulting mixture was evaporated to dryness. The 8 catalysts were filled into gas-heated reactors having an internal diameter of 30 mm. and per hour 25 liters of propylene, 10 liters of hydrogen chloride and 9 liters of oxygen were passed through at 225° C. and atmospheric pressure. The gases leaving the reactor were cooled whereby allyl chloride was obtained in the amounts as indicated in the following table.

Catalysts 1, 2, and 8 were purged with nitrogen and then contacted under identical conditions with isobutylene instead of propylene. Methallyl chloride was obtained in the amount as indicated in the following table.

In all cases and without consideration of the monochloroparaffins formed, the yields of allyl chloride and methallyl chloride, respectively, amounted to about 90%.

TABLE

| No. | Catalysts: 0.05 mole of tellurium on 150 cc. bentonite; Nos. 2–8 0.1 mole addition of (substituted) ammonium chloride | Grams allyl chloride per hr. from propylene | Grams methalyl chloride per hr. from isobutylene |
|---|---|---|---|
| 1 | Without addition | 6 | 4 |
| 2 | Ammonium chloride (NH$_4$Cl) | 10 | 7 |
| 3 | Trimethylammonium chloride (N(CH$_3$)$_3$HCl) | 8 | |
| 4 | Tetramethylammonium chloride (N(CH$_3$)$_4$Cl) | 11 | |
| 5 | Diethylammonium chloride (HN(C$_2$H$_5$)$_2$·HCl) | 8 | |
| 6 | Anilinium chloride (C$_6$H$_5$-NH$_2$·HCl) | 11 | |
| 7 | Piperidinium chloride (C$_5$H$_{11}$N·HCl) | 9 | |
| 8 | Pyridinium chloride (C$_5$H$_5$N·HCl) | 12 | 8 |

EXAMPLE 7

25 grams of basic tellurium sulfate (2 TeO$_2$·SO$_3$) were dissolved in 400 milliliters of an aqueous solution of 35 grams of diethanolamine and the solution was evaporated to dryness with 300 cc. of a granular aluminum silicate carrier. The catalyst obtained was filled into a heatable glass tube having a diameter of 25 mm. and at 220° C. and atmospheric pressure a gas mixture consisting per hour of 20 liters of propylene, 7 liters of oxygen and 9 liters of hydrogen chloride was passed through. The gas mixture leaving the reactor was cooled, whereby 13 grams of allyl chloride were isolated per hour.

What is claimed is:

1. In a process for preparing allyl chloride or its monomethyl-substitution product by reaction of oxygen with (a) a mixture of an olefin of 3 to 4 carbon atoms and hydrogen chloride (b) a monochloroparaffin of 3 to 4 carbon atoms, or (c) a mixture of an olefin of 3 to 4 carbon atoms, a monochloroparaffin of 3 to 4 carbon atoms and hydrogen chloride, the improvement which comprises carrying out said reaction at a temperature in the range of 20 to 350° C. in the presence of a catalyst containing from 0.1 to 30 percent by weight of tellurium, a tellurium oxide or tellurium chloride promoted by an additive of (A) a chloride, phosphate, sulfate, nitrate, oxide or hydroxide of potassium, rubidium or cesium or (B) ammonium chloride, an alkyl ammonium chloride, an aryl ammonium chloride, a chloride salt of piperidinium, a chloride salt of pyrrolidinium, a chloride salt of pyridinium, quinolinium, isoquinolinium, or the alkyl derivatives thereof, or a water soluble alkanolamine, the atomic proportion of alkali metal in A or nitrogen in B to tellurium being within the range of 0.1:1 to 10:1.

2. A process as defined in claim 1 wherein the alkali metal salt is potassium chloride, rubidium chloride or cesium chloride.

3. A process as defined in claim 1 wherein the additive is ammonium chloride, trimethyl ammonium chloride, tetramethyl ammonium chloride, diethyl ammonium chloride, aniline hydrochloride, piperidinium chloride, pyridinium chloride or diethanolamine.

4. The process as claimed in claim 1, wherein the ammonium salt is an ammonium hydrochloride.

5. The process as claimed in claim 1, wherein the catalyst is supported on a carrier material.

6. The process as claimed in claim 1, wherein the catalyst contains 0.5 to 20% by weight of tellurium.

7. The process as claimed in claim 1, wherein the components are reacted at a temperature in the range of from 100 to 350° C.

8. The process as claimed in claim 1, wherein the components are reacted under a pressure in the range of from 0.2 to 20 atmospheres.

9. The process as claimed in claim 1, wherein the components are reacted under a pressure in the range of from 1 to 10 atmospheres.

10. The process as claimed in claim 1, wherein propylene or isobutylene is reacted with hydrogen chloride and oxygen.

11. The process as claimed in claim 1, wherein isopropyl chloride or tert. butyl chloride is reacted with oxygen.

References Cited

FOREIGN PATENTS 553,950  6/1943  Great Britain.

BERNARD HELFIN, Primary Examiner

J. BOSKA, Assistant Examiner